US012681786B2

(12) United States Patent
Jalalzai et al.

(10) Patent No.: US 12,681,786 B2
(45) Date of Patent: Jul. 14, 2026

(54) METHODS AND SYSTEMS FOR FAST CONSENSUS WITHIN DISTRIBUTED LEDGERS

(71) Applicants: Mohammad Jalalzai, Vancouver (CA); Chen Feng, Vancouver (CA); Victoria Lemieux, Vancouver (CA)

(72) Inventors: Mohammad Jalalzai, Vancouver (CA); Chen Feng, Vancouver (CA); Victoria Lemieux, Vancouver (CA)

( * ) Notice: Subject to any disclaimer, the term of this patent is extended or adjusted under 35 U.S.C. 154(b) by 0 days.

(21) Appl. No.: 18/689,644

(22) PCT Filed: Sep. 7, 2022

(86) PCT No.: PCT/CA2022/051335
§ 371 (c)(1),
(2) Date: Mar. 6, 2024

(87) PCT Pub. No.: WO2023/035065
PCT Pub. Date: Mar. 16, 2023

(65) Prior Publication Data
US 2024/0370327 A1 Nov. 7, 2024

Related U.S. Application Data

(60) Provisional application No. 63/260,962, filed on Sep. 7, 2021.

(51) Int. Cl.
*G06F 11/00* (2006.01)
*G06F 11/07* (2006.01)

(52) U.S. Cl.
CPC ...... *G06F 11/0709* (2013.01); *G06F 11/0793* (2013.01)

(58) Field of Classification Search
CPC ....... G06F 11/0793; H04L 9/50; H04L 67/104
See application file for complete search history.

(56) References Cited

U.S. PATENT DOCUMENTS

| | | | |
|---|---|---|---|
| 10,713,133 B2 | 7/2020 | Abraham et al. | |
| 10,740,325 B2 | 8/2020 | Xie et al. | |
| 10,803,052 B2 | 10/2020 | Yang | |
| 10,938,577 B2 | 3/2021 | Tang | |

(Continued)

*Primary Examiner* — Marc Duncan
(74) *Attorney, Agent, or Firm* — Rosenberg, Klein & Lee

(57) ABSTRACT

Blockchains operate as decentralized, self-regulating systems that involve contributions from hundreds of thousands of participants who work on the verification and authentication of transactions occurring on the blockchain. The consensus mechanism within such a system provides the set of rules that determine the legitimacy of contributions made by the various participants of the blockchain. The consensus mechanism should not only be tolerant of faults but also have low latency in establishing consensus. Prior art solutions either could tolerate at most (n+1)/5 faults reaching consensus or execution of three or more communication steps to provide tolerance of arbitrary (Byzantine) faults or cannot guarantee strong safety property for an honest primary. To improve the speed of the consensus mechanism the inventors have established a BFT consensus protocol that operates with just two communication steps. The proposed protocol tolerates at most (n−1)/3 faults and provides strong safety guarantees for an honest primary.

10 Claims, 7 Drawing Sheets

(56)  References Cited

U.S. PATENT DOCUMENTS

| | | | |
|---|---|---|---|
| 2019/0251077 A1* | 8/2019 | Yang | H04L 9/3239 |
| 2020/0117657 A1* | 4/2020 | Xie | G06Q 20/02 |
| 2020/0142765 A1* | 5/2020 | Yang | G06F 11/182 |
| 2023/0059580 A1* | 2/2023 | Manevich | H04L 9/3255 |

* cited by examiner

```
Algorithm 1: Utilities for node i
 1 Func CreatePrepareMsg(type, v,s,h,d,qc_nr, cmd):
 2  │  b.type ← type
 3  │  b.v ← v
 4  │  b.s ← s
 5  │  b.h ← h
 6  │  b.parent ← d
 7  │  b.QC_nr ← qc_nr
 8  │  b.cmd ← cmd
 9  │  return b
10 End Function
11 Func GenerateQC(V):
12  │  qc.type ← m.type : m ∈ V
13  │  qc.viewNumber ← m.viewNumber ; m ∈ V
14  │  qc.block ← m.block : m ∈ V
15  │  qc.sig ← AggSign( qc.type, qc.viewNumber,
16  │  qc.s ← V.s,
17  │  qc.block,i, {m.Sig |m ∈ V})
18  │  return qc
19 End Function
20 Func CreateAggQC(η_set):
21  │  aggQC.QCset ← extract QCs from η_set
22  │  aggQC.sig ← AggSign( curView,
    │    {qc.block|qc.block ∈ aggQC.QCset}, {i|i ∈ N},
    │    {m.Sig|m ∈ η_set})
23  │  return aggQC
24 End Function
25 Func CreateNVMsg(AggQC,NextView):
26  │  NewViewMsg.type ← NEW-VIEW
27  │  NewViewMsg.AggQC ← AggQC
28  │  NewViewMsg.v ← NextView
29  │  return NewViewMsg
30 End Function
31 Func SafetyCheck(b,qc):
32  │  if b.viewNumber == qc.viewNumber
    │    ∧ b.s = qc.s + 1 then
33  │    │  return b.s > curS
34  │  end
35  │  if b.viewNumber > qc.viewNumber then
36  │    │  if β∧ B contains β's payload then
37  │    │    │  return b extends from highQC.block
38  │    │    │  if ¬β then
39  │    │    │    │  return b extends from highQC.block
40  │    │    │  end
41  │    │  end
42  │  end
43 End Function
```

Figure 3

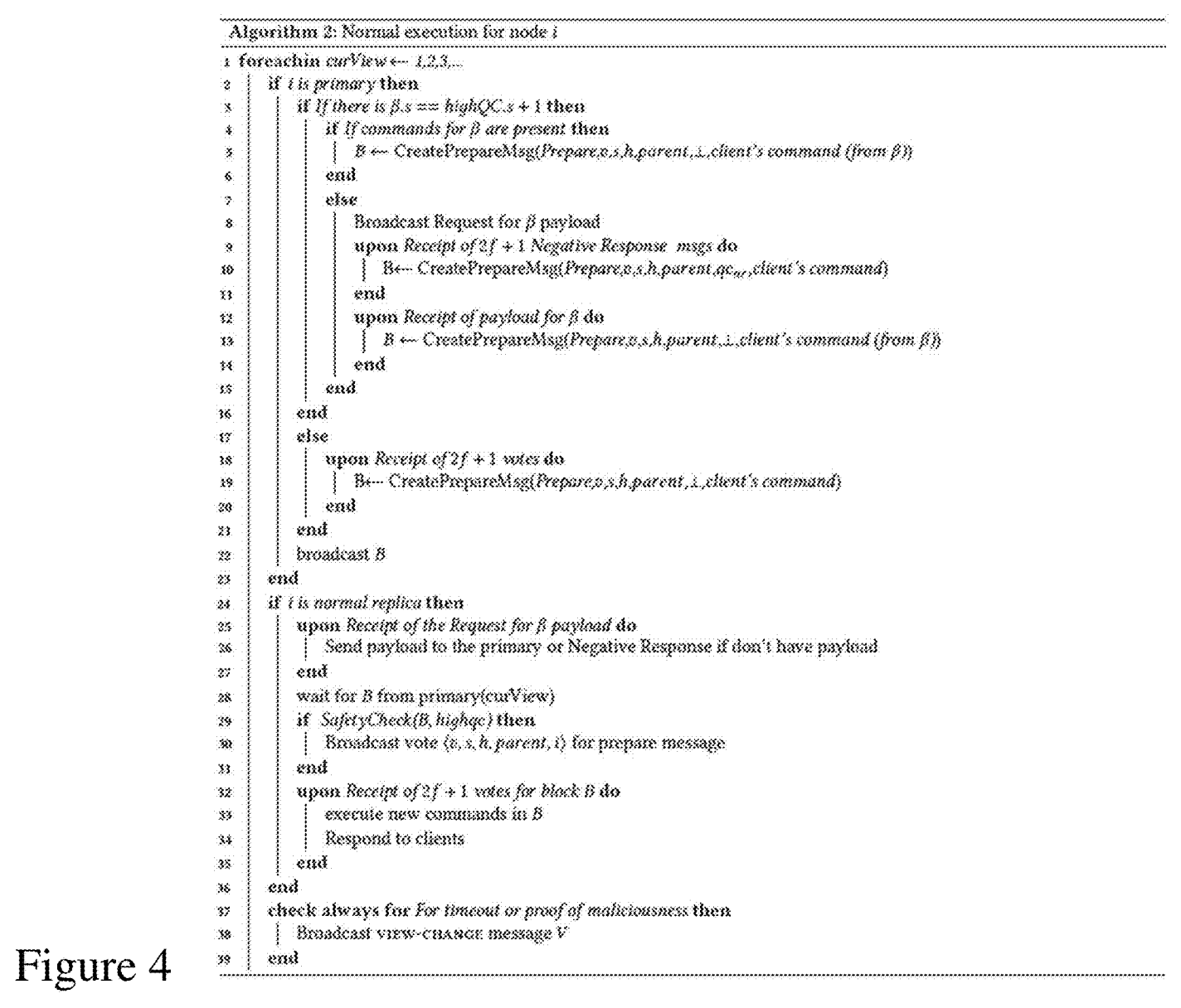

Algorithm 3: Normal execution for node $i$

```
1  foreach in curView ← 1,2,3,...
2      if i is primary then
3          if if there is B,s == highQC,s + 1 then
4              if if commands for B are present then
5                  B ← CreatePrepareMsg(Prepare,s,h,parent,⊥,client's command (from θ))
6              end
7              else
8                  Broadcast Request for B payload
9                  upon Receipt of 2f + 1 Negative Response  msgs do
10                     B ← CreatePrepareMsg(Prepare,s,h,parent,θc,client's command)
11                 end
12                 upon Receipt of payload for B do
13                     B ← CreatePrepareMsg(Prepare,s,h,parent,⊥,client's command (from θ))
14                 end
15             end
16         end
17         else
18             upon Receipt of 2f + 1 votes do
19                 B ← CreatePrepareMsg(Prepare,s,h,parent,⊥,client's command)
20             end
21         end
22         broadcast B
23     end
24     if i is normal replica then
25         upon Receipt of the Request for B payload do
26             Send payload to the primary or Negative Response if don't have payload
27         end
28         wait for B from primary(curView)
29         if SafetyCheck(B, highqc) then
30             Broadcast vote ⟨s, h, parent, i⟩ for prepare message
31         end
32         upon Receipt of 2f + 1 votes for block B do
33             execute new commands in B
34             Respond to clients
35         end
36     end
37     check always for for timeout or proof of maliciousness then
38         Broadcast view-change message V
39     end
```

Figure 4

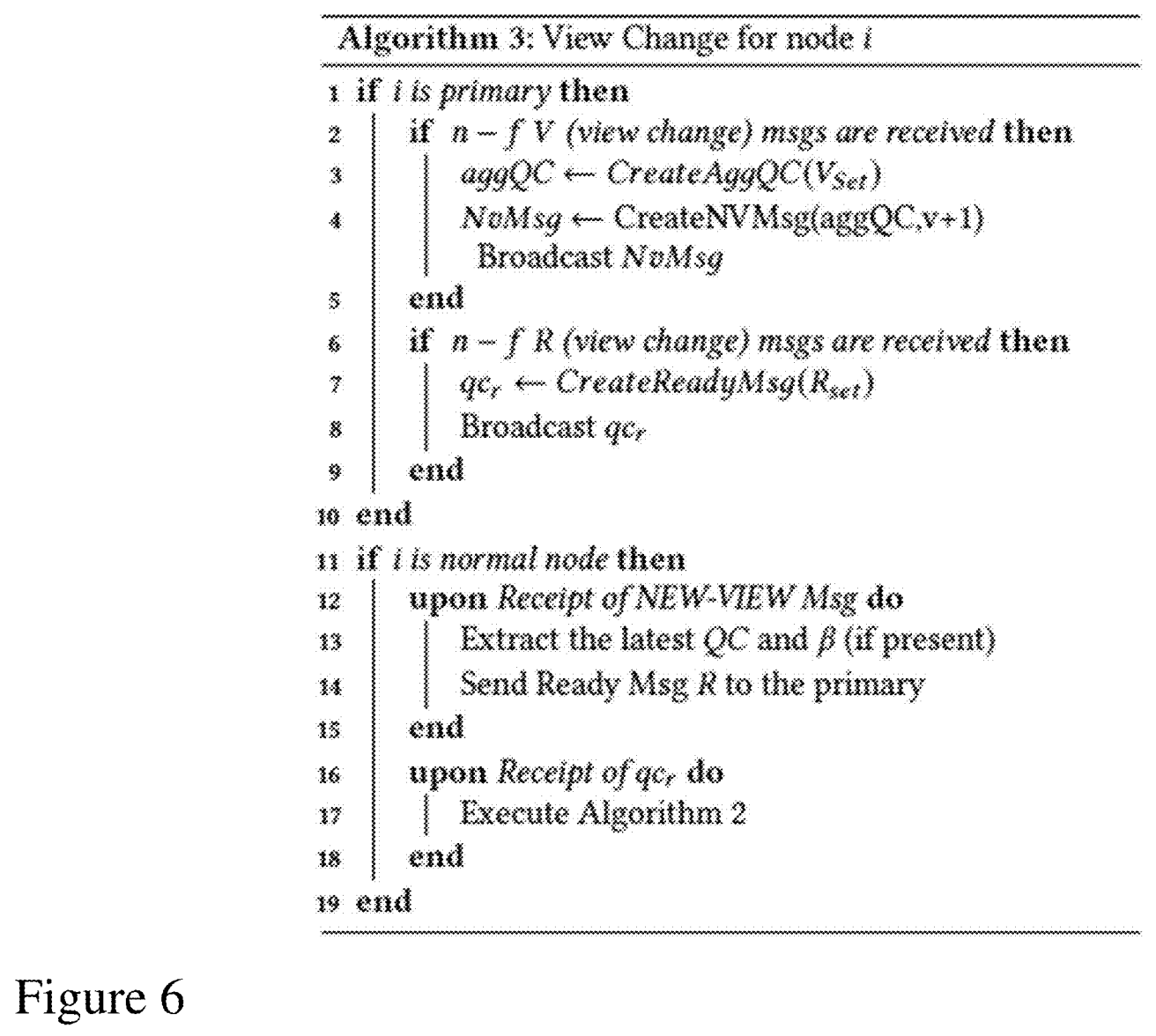

Algorithm 3: View Change for node $i$

1   if $i$ *is primary* then
2    if $n - f$ $V$ *(view change) msgs are received* then
3     $aggQC \leftarrow CreateAggQC(V_{Set})$
4     $NvMsg \leftarrow CreateNVMsg(aggQC, v+1)$
      Broadcast $NvMsg$
5    end
6    if $n - f$ $R$ *(view change) msgs are received* then
7     $qc_r \leftarrow CreateReadyMsg(R_{set})$
8     Broadcast $qc_r$
9    end
10   end
11   if $i$ *is normal node* then
12    upon *Receipt of NEW-VIEW Msg* do
13     Extract the latest $QC$ and $\beta$ (if present)
14     Send Ready Msg $R$ to the primary
15    end
16    upon *Receipt of $qc_r$* do
17     Execute Algorithm 2
18    end
19 end

Figure 6

METHODS AND SYSTEMS FOR FAST CONSENSUS WITHIN DISTRIBUTED LEDGERS

CROSS-REFERENCE TO RELATED APPLICATIONS

This patent application claims the benefit of priority as a 371 National Phase entry application of PCT/CA2022/051335 filed Sep. 7, 2022; which itself claims the benefit of priority to U.S. Provisional Patent Application 63/260,962 filed Sep. 7, 2021; the entire contents of each being incorporated herein by reference.

FIELD OF THE INVENTION

This patent application relates to distributed ledgers and more particularly to methods and systems for providing fast Byzantine fault tolerant consensus within nodes supporting the distributed ledger.

BACKGROUND OF THE INVENTION

In any centralized system, like a database holding key information about driving licenses in a country, a central administrator has the authority to maintain and update the database. The task of making any updates, like adding/deleting/updating names of people who qualified for certain licenses, is performed by a central authority who remains the sole in-charge of maintaining genuine records. However, blockchains operate as decentralized, self-regulating systems that work on scales up to the global scale without any single authority. They involve contributions from hundreds of thousands of participants who work on verification and authentication of transactions occurring on the blockchain.

In such a dynamically changing status of the blockchain, these publicly shared ledgers need an efficient, fair, real-time, functional, reliable, and secure mechanism to ensure that all the transactions occurring on the network are genuine and all participants agree on a consensus on the status of the ledger. This all-important task is performed by the consensus mechanism, which is a set of rules that decides on the legitimacy of contributions made by the various participants (i.e., nodes or transactors) of the blockchain.

It is desirable for a consensus mechanism to not only be tolerant of faults (e.g. crash faults or Byzantine faults (arbitrary faults)) but also to have low latency in establishing consensus. The latter is important as until consensus of the current block in the chain is reached subsequent transactions cannot rely upon the data within that block essentially preventing any further activity until consensus is reached. In many instances, this time to consensus is not only a limit to the speed at which transactions can be made but a critical limit such as where the block is associated with a financial transaction at a point of sale terminal, acquiring permission to access medical data etc. for example.

Accordingly, it would be beneficial to achieve consensus faster. The inventors have established a methodology for fast Byzantine Fault Tolerant (BFT) consensus for blockchains which they refer to as Fast B4B.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to distributed ledgers and more particularly to methods and systems for providing fast Byzantine fault tolerant consensus within nodes supporting the distributed ledger.

In accordance with an embodiment of the invention there is provided a method comprising:

providing a plurality of n nodes communicating via a communications network, each node performing tasks relating to a distributed ledger and comprising a microprocessor for executing software instructions stored within a memory accessible to the microprocessor; and providing the memory storing the software instructions where the software instructions relate to processing blocks of the distributed ledger and a protocol for handling Byzantine faults within a subset of the plurality of n nodes; wherein the protocol achieves consensus in two communication steps, a first communication step of the two communication steps being receipt of a message to a node of the plurality of n nodes and a second communication step of the two communication steps being transmittal of another message from the node of the plurality of n nodes;

the protocol can reach consensus when a number f of the plurality of n nodes exhibit a Byzantine fault; and f is the upper bound on number of Byzantine nodes and $f=(n-1)/3$.

In accordance with an embodiment of the invention there is provided a system comprising:

a plurality of n nodes communicating via a communications network, each node performing tasks relating to a distributed ledger and comprising a microprocessor for executing software instructions stored within a memory accessible to the microprocessor; and the memory storing the software instructions where the software instructions relate to processing blocks of the distributed ledger and a protocol for handling Byzantine faults within a subset of the plurality of n nodes; wherein the protocol achieves consensus in two communication steps, a first communication step of the two communication steps being receipt of a message to a node of the plurality of n nodes and a second communication step of the two communication steps being transmittal of another message from the node of the plurality of n nodes;

the protocol can reach consensus when a number f of the plurality of n nodes exhibit a Byzantine fault; and f is the upper bound on number of Byzantine nodes and $f=(n-1)/3$.

In accordance with an embodiment of the invention there are provided computer executable instructions stored upon a non-volatile non-transitory storage medium for execution by a microprocessor, the computer executable instructions when executed configure the microprocessor to:

execute a process for processing blocks of the distributed ledger; wherein the process includes a protocol for handling Byzantine faults within a subset of a plurality of n nodes which communicate information relating to the distributed ledger via a communications network.

In accordance with an embodiment of the invention there is provided a method comprising:

establishing a protocol in execution upon providing a plurality of n nodes communicating via a communications network, each node performing tasks relating to a distributed ledger and comprising a microprocessor for executing software instructions stored within a memory accessible to the microprocessor; wherein the protocol can reach consensus when a number f of the plurality of n nodes exhibit a Byzantine fault; and f is the upper bound on number of Byzantine nodes and f=(n−1)/3.

In accordance with an embodiment of the invention there is provided a method comprising:

establishing a protocol in execution upon providing a plurality of n nodes communicating via a communications network, each node performing tasks relating to a distributed ledger and comprising a microprocessor for executing software instructions stored within a memory accessible to the microprocessor; wherein a first mode of the protocol is established when blocks of the distributed ledger are added into the distributed ledger without a failure being encountered; and a second mode of the protocol is established when a failure is encountered where the second mode of the two modes results in change of a primary node transmitting blocks for which consensus is sought in order to add them to the distributed ledger and the primary node previously transmitting blocks for which consensus was sought in order to add them to the distributed ledger is blacklisted if it performs equivocation (proposes multiple blocks for the same sequence).

In accordance with an embodiment of the invention there is provided a method comprising:

establishing a protocol in execution upon providing a plurality of n nodes communicating via a communications network, each node performing tasks relating to a distributed ledger and comprising a microprocessor for executing software instructions stored within a memory accessible to the microprocessor; wherein the protocol can reach consensus when a number f of the plurality of n nodes exhibit a Byzantine fault;

the protocol results in blacklisting of the number f of the plurality of n nodes exhibiting Byzantine faults.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 3 depicts an exemplary algorithm representing utilities for a node within a distributed ledger based system according to an embodiment of the invention;

FIG. 4 depicts an exemplary algorithm representing for normal execution for a node within a distributed ledger based system according to an embodiment of the invention;

FIG. 6 depicts an exemplary algorithm representing a view change mode for a node within a distributed ledger based system according to an embodiment of the invention.

DETAILED DESCRIPTION

Figure 1:
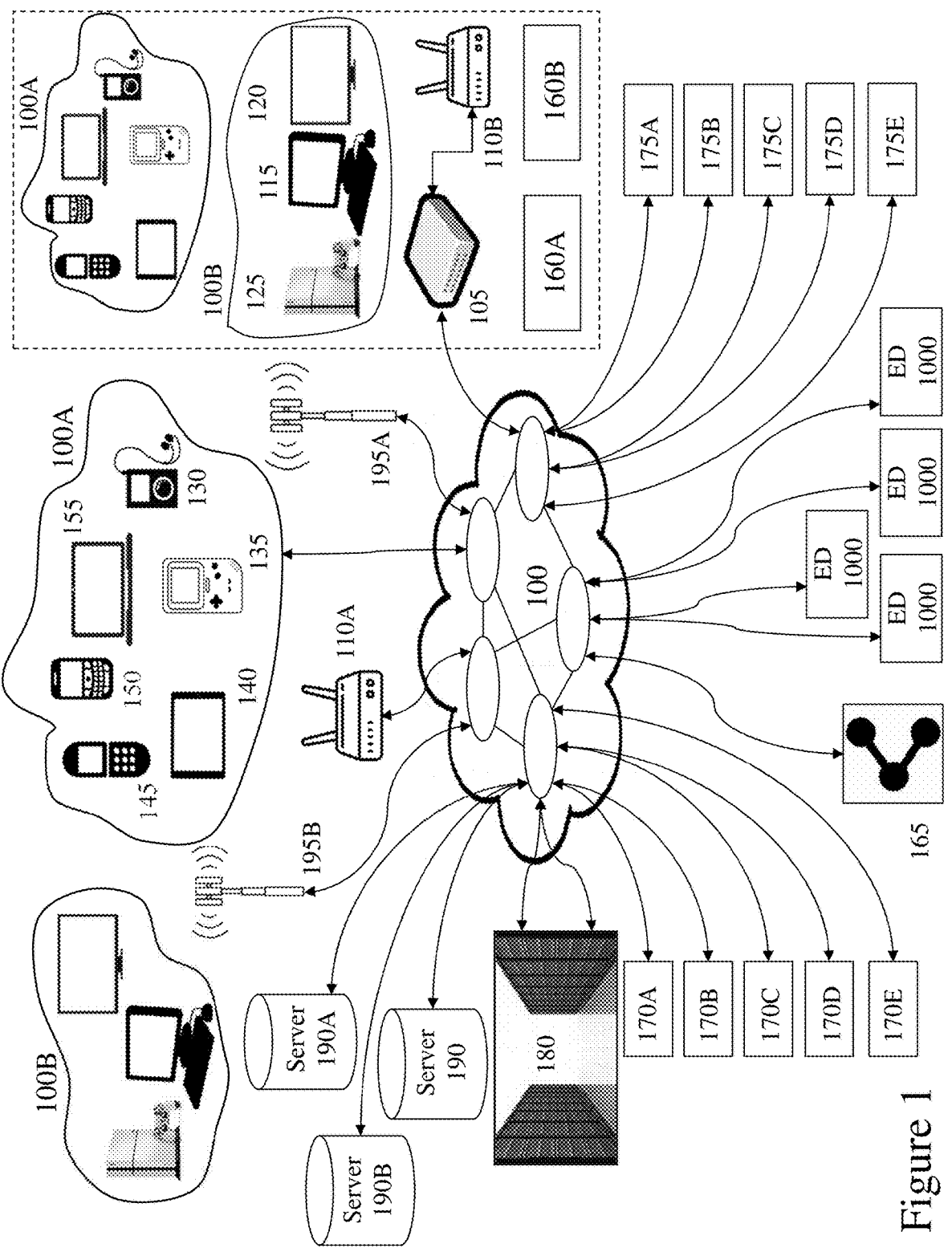
FIG. 1 depicts an exemplary network environment within which configurable electrical devices according to and supporting embodiments of the invention may be deployed and operate.

The present invention is directed to distributed ledgers and more particularly to methods and systems for providing fast Byzantine fault tolerant consensus within nodes supporting the distributed ledger.

The ensuing description provides representative embodiment(s) only, and is not intended to limit the scope, applicability, or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "record" as used herein and throughout this disclosure, refer to, but is not limited to, information created, received, and maintained as evidence and as an asset by an organization or person, in pursuit of legal obligations or in the transaction of business.

A "transaction record" as used herein and throughout this disclosure, refer to, but is not limited to, a record documenting a transaction.

A "ledger record" or "ledger records" as used herein and throughout this disclosure, refer to, but is not limited to, a record or records containing one or more of transaction record(s), hash value(s) of transaction record(s), and reference(s) to transaction record(s) recorded on one or more distributed ledgers (e.g. blockchain) using a distributed ledger technology (DLT).

A "record system" or "records system" as used herein and throughout this disclosure, refer to, but is not limited to, an information system that captures, manages, and provides access to records over time.

A "credential" as used herein and throughout this disclosure, refers to, but is not limited to, a set of claims made by an issuer.

A "verifiable credential" as used herein and throughout this disclosure, refers to, but is not limited to, a tamper-evident credential that has an authorship that can be cryptographically verified.

An "issuer" as used herein and throughout this disclosure, refers to, but is not limited to, a role an entity can perform by asserting claims about one or more subjects, creating a verifiable credential from these claims, and transmitting the verifiable credential to a holder.

A "holder" as used herein and throughout this disclosure, refers to, but is not limited to, a role an entity might perform by possessing one or more verifiable credentials and generating presentations from them.

A "verifier" as used herein and throughout this disclosure, refers to, but is not limited to, an entity verifying a claim about a given subject.

A "proof request" as used herein and throughout this disclosure, refers to, but is not limited to, a request for one or more verifiable credentials, issued by one or more issuers, held by one or more holders.

A "proof presentation" as used herein and throughout this disclosure, refers to, but is not limited to, data derived from one or more verifiable credentials, issued by one or more issuers, that is shared with a specific verifier or verifiers.

A "proof verification" as used herein and throughout this disclosure, refers to, but is not limited to, an evaluation as to whether a verifiable credential or verifiable presentation is an authentic and timely statement of the issuer or presenter, respectively.

A "wireless standard" as used herein and throughout this disclosure, refer to, but is not limited to, a standard for transmitting signals and/or data through electromagnetic radiation which may be optical, radio-frequency (RF) or microwave although typically RF wireless systems and techniques dominate. A wireless standard may be defined globally, nationally, or specific to an equipment manufacturer or set of equipment manufacturers. Dominant wireless standards at present include, but are not limited to IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, Bluetooth, Wi-Fi, Ultra-Wideband and WiMAX. Some standards may be a conglomeration of sub-standards such as IEEE 802.11 which may refer to, but is not limited to, IEEE 802.1a, IEEE 802.11b, IEEE 802.11g, or IEEE 802.11n as well as others under the IEEE 802.11 umbrella.

A "wired standard" as used herein and throughout this disclosure, generally refer to, but is not limited to, a standard for transmitting signals and/or data through an electrical cable discretely or in combination with another signal. Such wired standards may include, but are not limited to, digital subscriber loop (DSL), Dial-Up (exploiting the public switched telephone network (PSTN) to establish a connection to an Internet service provider (ISP)), Data Over Cable Service Interface Specification (DOCSIS), Ethernet, Gigabit home networking (G.hn), Integrated Services Digital Network (ISDN), Multimedia over Coax Alliance (MoCA), and Power Line Communication (PLC, wherein data is overlaid to AC/DC power supply). In some embodiments a "wired standard" may refer to, but is not limited to, exploiting an optical cable and optical interfaces such as within Passive Optical Networks (PONs) for example.

A "sensor" as used herein may refer to, but is not limited to, a transducer providing an electrical output generated in dependence upon a magnitude of a measure and selected from the group comprising, but is not limited to, environmental sensors, medical sensors, biological sensors, chemical sensors, ambient environment sensors, position sensors, motion sensors, thermal sensors, infrared sensors, visible sensors, RFID sensors, and medical testing and diagnosis devices.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of community organizations, members of charity organizations, men and women. In its broadest sense the user may further include, but not be limited to, software systems, mechanical systems, robotic systems, android systems, etc. that may be characterised by an ability to exploit one or more embodiments of the invention. A user may also be associated through one or more accounts and/or profiles with one or more of a service provider, third party provider, enterprise, social network, social media etc. via a dashboard, web service, website, software plug-in, software application, and graphical user interface.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "profile" as used herein, and throughout this disclosure, refers to a computer and/or microprocessor readable data file comprising data relating to settings and/or limits of an adult device. Such profiles may be established by a manufacturer/supplier/provider of a device, service, etc. or they may be established by a user through a user interface for a device, a service or a PED/FED in communication with a device, another device, a server or a service provider etc.

A "computer file" (commonly known as a file) as used herein, and throughout this disclosure, refers to a computer resource for recording data discretely in a computer storage device, this data being electronic content. A file may be defined by one of different types of computer files, designed for different purposes. A file may be designed to store electronic content such as a written message, a video, a computer program, or a wide variety of other kinds of data. Some types of files can store several types of information at once. A file can be opened, read, modified, copied, and closed with one or more software applications an arbitrary number of times. Typically, files are organized in a file system which can be used on numerous different types of storage device exploiting different kinds of media which keeps track of where the files are located on the storage device(s) and enables user access. The format of a file is defined by its content since a file is solely a container for data, although, on some platforms the format is usually indicated by its filename extension, specifying the rules for how the bytes must be organized and interpreted meaningfully. For example, the bytes of a plain text file are associated with either ASCII or UTF-8 characters, while the bytes of image, video, and audio files are interpreted otherwise. Some file types also allocate a few bytes for metadata, which allows a file to carry some basic information about itself.

"Encryption" as used herein may refer to, but is not limited to, the processes of encoding messages or information in such a way that only authorized parties can read it. This includes, but is not limited to, symmetric key encryption through algorithms such as Twofish, Serpent, AES (Rijndael), Blowfish, CAST5, RC4, 3DES, and IDEA for example, and public-key encryption through algorithms such as Diffie-Hellman, Digital Signature Standard, Digital Signature Algorithm, ElGamal, elliptic-curve techniques, password-authenticated key agreement techniques, Paillier cryptosystem, RSA encryption algorithm, Cramer-Shoup cryptosystem, and YAK authenticated key agreement protocol.

A "blockchain" (originally block chain) represents an embodiment of a cryptographic distributed ledger or an embodiment of a DLT. A blockchain as used herein may refer to, but not be limited to, a continuously growing list of records, called blocks, which are linked and secured using cryptography. Each block typically contains a cryptographic hash of one or more other blocks in the chain, a timestamp and transaction data. By design, a blockchain is inherently resistant to modification of the data and provides for an open, distributed ledger that can record transactions between two parties efficiently and in a verifiable and permanent way. For use as a distributed ledger, a blockchain is typically managed by a peer-to-peer network collectively adhering to a protocol for inter-node communication and validating new blocks. Once recorded, the data in any given block cannot be altered retroactively without the alteration of all subsequent blocks in the chain, which requires the collusion of the network majority. Accordingly, a blockchain is secure by design and exemplifies a distributed computing system with high Byzantine fault tolerance. Decentralized consensus has therefore been achieved with a blockchain which makes them suitable for the recording of events, medical records, and other records management activities, such as identity management, financial transaction processing, documenting provenance, food traceability, voting, etc. Within embodiments of the invention the cryptographic hash may also include a pointer (and possibly a hash) of the address of the next block in the chain.

A "distributed ledger" as used herein may refer to, but not be limited to, a is a database that is consensually shared and synchronized across one or more networks spread across multiple sites, institutions and/or geographies. It allows transactions to have public "witnesses," thereby making a cyberattack more difficult. The participant at each node of the network can access the recordings shared across that network and can own an identical copy of it. Further, any changes or additions made to the ledger are reflected and copied to all participants quickly, usually within seconds or minutes. Underlying a distributed ledger technology are blockchains.

A "cryptographic currency" or "crypto currency" as used herein may refer to, but not be limited to, a digital asset designed to work as a medium of exchange that uses cryptography to secure its transactions, to control the creation of additional units, and to verify the transfer of assets. Cryptocurrencies are a type of digital currencies, alternative currencies, and virtual currencies. Cryptocurrencies use decentralized control as opposed to centralized electronic money and central banking systems. The decentralized control of each cryptocurrency works through a blockchain, which is a public transaction database, functioning as a distributed ledger.

"Metadata" as used herein, and throughout this disclosure, refers to information stored as data that provides information about other data. Many distinct types of metadata exist, including but not limited to, descriptive metadata, structural metadata, administrative metadata, reference metadata and statistical metadata. Descriptive metadata may describe a resource for purposes such as discovery and identification and may include, but not be limited to, elements such as title, abstract, author, and keywords. Structural metadata relates to containers of data and indicates how compound objects are assembled and may include, but not be limited to, how pages are ordered to form chapters, and typically describes the types, versions, relationships and other characteristics of digital materials. Administrative metadata may provide information employed in managing a resource and may include, but not be limited to, when and how it was created, file type, technical information, and who can access it. Reference metadata may describe the contents and quality of statistical data whereas statistical metadata may also describe processes that collect, process, or produce statistical data. Statistical metadata may also be referred to as process data.

An "artificial intelligence system" (referred to hereafter as artificial intelligence, AI) as used herein, and throughout disclosure, refers to machine intelligence or machine learning in contrast to natural intelligence. An AI may refer to analytical, human inspired, or humanized artificial intelligence. An AI may refer to the use of one or more machine learning algorithms and/or processes. An AI may employ one or more of an artificial network, decision trees, support vector machines, Bayesian networks, and genetic algorithms. An AI may employ a training model or federated learning.

A "Byzantine fault" or "Byzantine failure" (also referred to as interactive consistency, source congruency or error avalanche) is a condition of a computer system, particularly distributed computing systems, where components may fail and there is imperfect information on whether a component has failed or not. Within a Byzantine fault, a component of a network, system, device etc. can inconsistently appear both failed and functioning to failure-detection systems, presenting different symptoms or behaviours to different observers. Accordingly, it is difficult for the other components to declare it failed and shut it out as they need to first reach a consensus regarding which component has failed in the first place. Byzantine fault tolerance (BFT) is the dependability of a fault-tolerant computer system to such conditions.

Within the following description the term "blockchain" is employed. Whilst blockchain to one of skill in the art may define a specific embodiment of a cryptographic distributed ledger or an embodiment of a distributed ledger technology (DLT) such as those found in cryptocurrencies derive from bitcoin the term has entered general usage to mean a growing list of records, called blocks, that are linked together using cryptography where each block contains a cryptographic hash of the previous block in the chain, a timestamp, and transaction data (e.g. represented as a Merkle tree). The timestamp proves that the transaction data existed when the block was published in order to get into its hash. As blocks each contain information about the block previous to it, they form a chain, with each additional block reinforcing the ones before it. Therefore, blockchains are generally considered to be resistant to modification of their data because once recorded, the data in any given block cannot be altered retroactively without altering all subsequent blocks in the chain. It is within this general sense of the term that it is used below.

Referring to FIG. 1 there is depicted a Network 100 within which embodiments of the invention may be employed supporting Fast Byzantine Fault Tolerant (BFT) consensus for Blockchain (Fast-B4B) and accordingly Fast-B4B Systems, Applications and Platforms (Fast-B4B-SAPs) according to embodiments of the invention. As shown first and second user groups 100A and 100B respectively interface to a telecommunications Network 100. Within the representative telecommunication architecture, a remote central exchange 180 communicates with the remainder of a telecommunication service providers network via the Network 100 which may include for example long-haul OC-48/ OC-192 backbone elements, an OC-48 wide area network (WAN), a Passive Optical Network, and a Wireless Link. The central exchange 180 is connected via the Network 100 to local, regional, and international exchanges (not shown for clarity) and therein through Network 100 to first and second cellular APs 195A and 195B respectively which provide Wi-Fi cells for first and second user groups 100A and 100B respectively. Also connected to the Network 100 are first and second Wi-Fi nodes 110A and 110B, the latter of which being coupled to Network 100 via router 105. Second Wi-Fi node 110B is associated with Enterprise 160 comprising other first and second user groups 100A and 100B. Second user group 100B may also be connected to the Network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as router 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the Network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the Network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 and Bluetooth as well in an ad-hoc manner.

Also connected to the Network 100 are Social Networks (SOCNETS) 165, first and second service providers 170A and 170B respectively, first and second third party service providers 170C and 170D respectively, and a user 170E. Also connected to the Network 100 are first and second enterprises 175A and 175B respectively, first and second organizations 175C and 175D respectively, and a government entity 175E. Also depicted are first and second servers 190A and 190B may host according to embodiments of the inventions multiple services associated with Fast Byzantine Fault Tolerant (BFT) consensus for Blockchain (Fast-B4B) Systems, Applications and Providers (Fast-B4B-SAPs); a provider of a SOCNET or Social Media (SOME) exploiting Fast-B4B-SAP features; a provider of a SOCNET and/or SOME not exploiting FAST-B4B-SAP features; a provider of services to PEDS and/or FEDS; a provider of one or more aspects of wired and/or wireless communications; an Enterprise 160 exploiting Fast-B4B-SAP features; license databases; content databases; image databases; content libraries; customer databases; websites; and software applications for download to or access by FEDs and/or PEDs exploiting and/or hosting Fast-B4B-SAP features. First and second primary content servers 190A and 190B may also host for example other Internet services such as a search engine, financial services, third party applications and other Internet based services. Other servers such as Server 190C may handle dedicated functions for embodiments of the invention where these servers are not publicly accessible to users.

Also depicted in FIG. 1 are Electronic Devices (EDs) 1000 according to embodiments of the invention such as described and depicted below in respect of FIG. 2. As depicted in FIG. 1 the EDs 1000 communicate directly to the Network 100. The EDs 1000 may communicate to the Network 100 through one or more wireless or wired interfaces included those, for example, selected from the group comprising IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Accordingly, a user may exploit a PED and/or FED within an Enterprise 160, for example, and access one of the first or second primary content servers 190A and 190B respectively to perform an operation such as accessing/downloading an application which provides FAST-B4B-SAP features according to embodiments of the invention; execute an application already installed providing FAST-B4B-SAP features; execute a web based application providing FAST-B4B-SAP features; or access content. Similarly, a CONCUS may undertake such actions or others exploiting embodiments of the invention exploiting a PED or FED within first and second user groups 100A and 100B respectively via one of first and second cellular APs 195A and 195B respectively and first Wi-Fi nodes 110A. It would also be evident that a CONCUS may, via exploiting Network 100 communicate via telephone, fax, email, SMS, social media, etc.

Within embodiments of the invention a Fast Byzantine Fault Tolerant (BFT) consensus for Blockchain (Fast-B4B) may be triggered through a user performing an action which accesses or generates a transaction and transactions are then batched into a block for a new blockchain or existing blockchain. The Fast-B4B employs a series of nodes which provide the functionality for the blockchain, i.e. a distributed ledger. As such the user may perform the action having a blockchain associated with it upon or a node handling one or more blockchain processes may be within embodiments of the invention, but not limited to, an ED 1000, a server 190C, first server 190A, second server 190B, a laptop computer 155, a portable gaming console 135, tablet computer 140, smartphone 150, cellular telephone 145, a portable multimedia player 130, a gaming console 125, a personal computer 115, a wireless/Internet enabled television 120, a router 105, first and second Wi-Fi nodes 110A and 110B, or a central exchange 180. In essence any PED or FED connected to permanently or temporarily connected to Network 100 and therein other nodes may be a node permanently or temporarily.

Nodes may or may not be associated with one or more Enterprises 160 as well as Social Networks (SOCNETS) 165, service providers such as first and second service providers 170A and 170B respectively, third party services providers such as first and second third party service providers 170C and 170D, users such as user 170E, enterprises such as first and second enterprises 175A and 175B respectively, organizations such as first and second organizations 175C and 175D respectively, and government entities such as government entity 175E.

Figure 2:
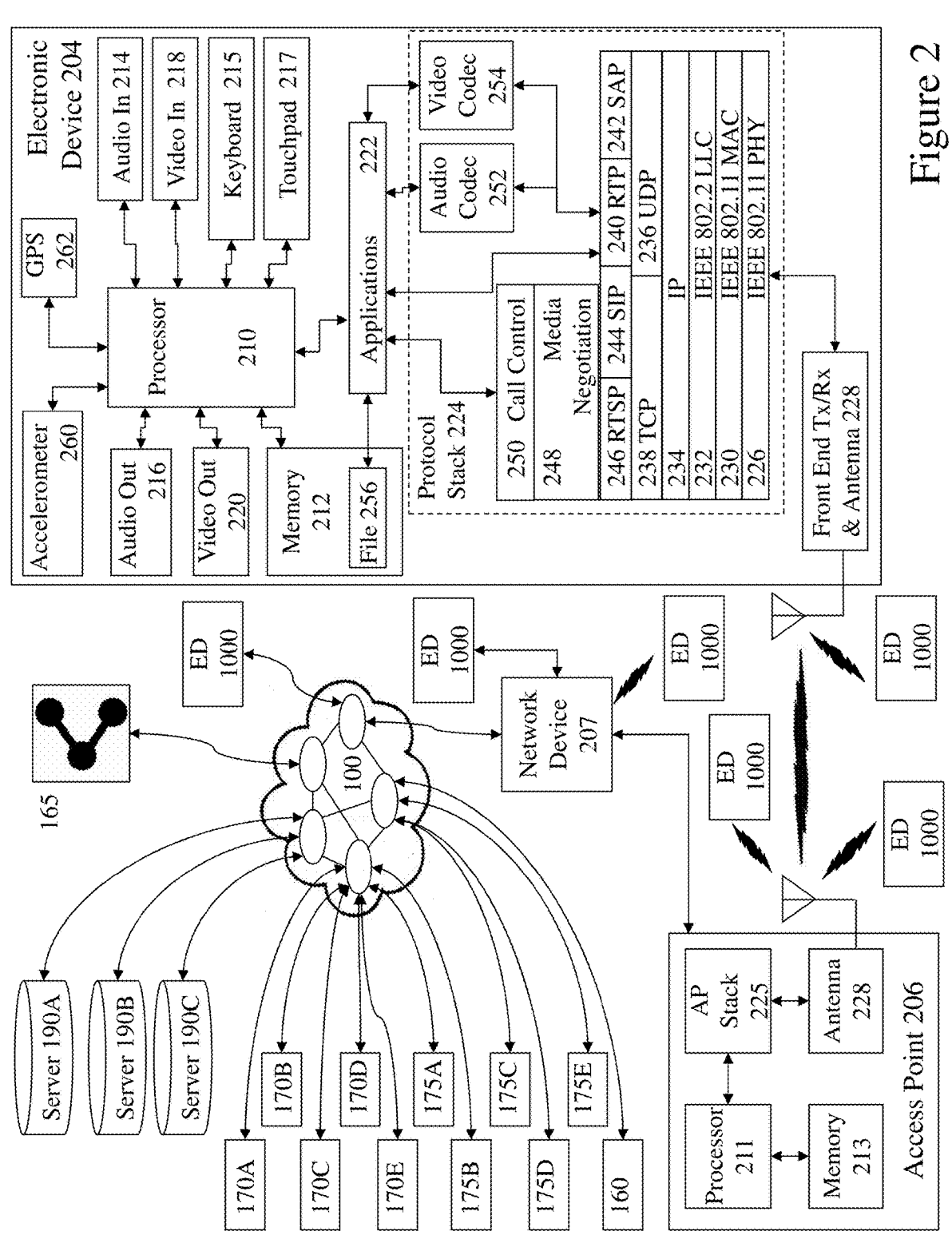
FIG. 2 depicts an exemplary electronic device supporting communications to a network such as depicted in FIG. 1 and supporting embodiments of the invention.
Figure 5:
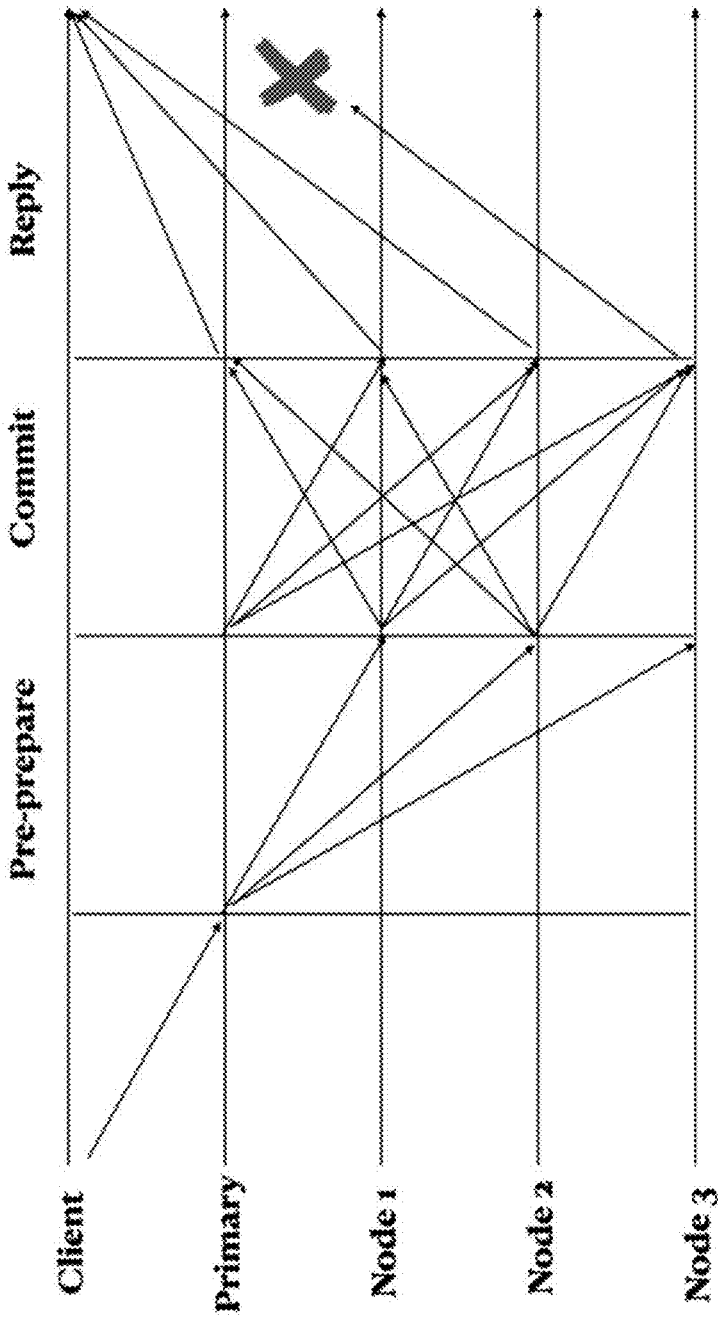
FIG. 5 depicts schematically a fast Byzantine fault tolerant messaging pattern for a distributed ledger implemented between nodes within a distributed ledger based system according to an embodiment of the invention.

Now referring to FIG. 2 there is depicted an Electronic Device 204 and network access point 207 supporting Fast-B4B-SAP features according to embodiments of the invention. Electronic Device 204 may, for example, be a PED and/or FED and may include additional elements above and beyond those described and depicted or it may contain a subset of these elements. A minimal set of elements may be considered to be those supporting processing of data, storage of instructions and/or data, and a communications interface to the Network 100. Also depicted within the Electronic Device 204 is the protocol architecture as part of a simplified functional diagram of a system 200 that includes an Electronic Device 204, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1 as well as directly as indicated. Network devices 207 are coupled to Network 100 and therein Social Networks (SOCNETS) 165, first and second service providers 170A and 170B respectively, first and second third party service providers 170C and 170D respectively, a user 170E, first and second enterprises 175A and 175B respectively, first and second organizations 175C and 175D respectively, and a government entity 175E.

The Electronic Device 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic Device 204 may include an audio input element 214, for example a microphone, and an audio output element 216, for example, a speaker, coupled to any of processors 210. Electronic Device 204 may include a video input element 218, for example, a video camera or camera, and a video output element 220, for example an LCD display, coupled to any of processors 210. Electronic Device 204 also includes a keyboard 215 and touchpad 217 which may for example be a physical keyboard and touchpad allowing the user to enter content or select functions within one of more applications 222. Alternatively, the keyboard 215 and touchpad 217 may be predetermined regions of a touch sensitive element forming part of the display within the Electronic Device 204. The one or more applications 222 that are typically stored in memory 212 and are executable by any combination of processors 210. Electronic Device 204 also includes accelerometer 260 providing three-dimensional motion input to the process 210 and GPS 262 which provides geographical location information to processor 210.

Electronic Device 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multimedia protocol stack for example. Likewise, AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Front-End Tx/Rx & Antenna 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238.

Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206. Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230.

It would be apparent to one skilled in the art that elements of the Electronic Device 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by Electronic Device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Also depicted in FIG. 2 are Electronic Devices (EDs) 1000 according to embodiments of the invention such as described and depicted below in respect of FIGS. 3 to 6 respectively. As depicted in FIG. 2 an EDs 1000 may communicate directly to the Network 100. Other EDs 1000 may communicate to the Network Device 207, Access Point 206, and Electronic Device 204. Some EDs 1000 may communicate to other EDs 1000 directly. Within FIG. 2 the EDs 1000 coupled to the Network 100 and Network Device 207 communicate via wired interfaces. The EDs 1000 coupled to the Access Point 206 and Electronic Device 204 communicate via wireless interfaces. Each ED 1000 may communicate to another electronic device, e.g. Access Point 206, Electronic Device 204 and Network Device 207, or a network, e.g. Network 100. Each ED 1000 may support one or more wireless or wired interfaces including those, for example, selected from the group comprising IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Accordingly, FIG. 2 depicts an Electronic Device 204, e.g. a PED, wherein one or more parties including, but not limited to, a user, users, an enterprise, enterprises, third party provider, third party providers, wares provider, wares providers, financial registry, financial registries, financial provider, and financial providers may engage in one or more financial transactions relating to an activity including, but not limited to, e-business, P2P, C2B, B2B, C2C, B2G, C2G, P2D, and D2D via the Network 100 using the electronic device or within cither the access point 206 or network device 207 wherein details of the transaction are then coupled to the Network 100 and stored within remote servers.

Optionally, rather than wired and/or wireless communication interfaces devices may exploit other communication interfaces such as optical communication interfaces and/or satellite communications interfaces. Optical communications interfaces may support Ethernet, Gigabit Ethernet, SONET, Synchronous Digital Hierarchy (SDH) etc.

Within the prior art blockchain or distributed ledger consensus (hereinafter simply consensus) has resulted in protocols that can tolerate crash faults or Byzantine faults (i.e., arbitrary faults). A crash fault or crash failure being typically defined as being when a suffers from an omission failure once and then continues to not respond. A Byzantine fault is typically defined as an arbitrary fault that occurs during the execution of an algorithm or process by a distributed system.

As noted earlier low latency is one of the desired properties for a consensus protocol. One factor defining the latency of the consensus protocol is the number of steps the protocol requires. Within the prior art there have been proposed fast crash failure tolerant protocols that can achieve consensus in through communications requiring just one round trip (RTW) or two communication steps (i.e., a communication step to a node or nodes and a communication step from the node or nodes). However, these required that certain conditions be met such as, for example, that there is no dependency among transactions which is in itself limiting when considering many of the current and anticipated applications of blockchains.

On the other hand, Byzantine faults are arbitrary faults that not only include crash faults/crash failures but also more severe faults including, but not limited to, software bugs, malicious attacks, and collusion among malicious processors (nodes) etc. Byzantine fault-tolerant protocols in the art achieve fault tolerance by replicating a state also called State Machine Replication (SMR). Within blockchains state machine replication is a method for implementing a fault-tolerant service by replicating nodes and coordinating interactions with node replicas. Byzantine SMRs in the art have sought to increase throughput by either reducing the latency of consensus instances that they run sequentially or by reducing the number of replicas that send messages to others in order to reduce the network usage. Unfortunately, the former approach makes use of resources in bursts whereas the latter requires CPU-intensive authentication mechanisms.

In any use case the underlying BFT protocol must remain efficient. More specifically, the protocol response time must remain fast as this helps the client requests get executed faster and responses returned to the client faster. Hence, greatly improving the client experience.

Accordingly, within BFT-based consensus protocols, one of important aspects that affect the protocol latency is the number of communication steps. This becomes particularly important then the protocol is operating within a Wide-Area-Network (WAN) environment as the latency for each communication step may be orders of magnitude higher in the WAN than if the consensus protocol is only operating within a Local Area Network (LAN).

Generally, partially synchronous Byzantine Fault Tolerant (BFT) based consensus protocols either operate in three communication steps or more during normal execution or in the absence of failure. Accordingly, the inventors have established a methodology for improving the normal execution latency as the worst-case latency of partially synchronous BFT consensus protocols cannot be bounded. Accordingly, inventors have established a BFT based consensus protocol that operates with just two communication steps, which is referred to as a Fast BFT consensus protocol, which improves upon the prior art.

Fast BFT protocols are known in the art that can reach consensus with two communication steps. For example, Kursawe in "Optimistic byzantine agreement," (21st IEEE Symposium on Reliable Distributed Systems, 2002, pp. 262-267) only achieves consensus if all the nodes 3f+1 (where f is the upper bound on the number of Byzantine nodes) in the network are honest. Hence, these protocols lack resilience against Byzantine faults. Martin et al in "Fast byzantine consensus" (IEEE Trans. Dependable Secure. Comput., Vol 3(3), 2006, pp. 202-215) can also achieve consensus in two communication steps, but the number of Byzantine faults it can tolerate in the worst case is small, n=5f+1 (i.e. upper bound of Byzantine nodes f=(n−1)/5). Abraham et al. in "Good-case latency of byzantine broadcast: a complete categorization" (ACM Symposium on Principles of Distributed Computing, 2021, pp. 331-341) improve marginally upon Martin where Byzantine consensus can be achieved in two communication steps with n=5f−1 (i.e. upperboundf=(n+1)/5). Practical Byzantine Fault Tolerance (PBFT) with tentative execution has been reported by M. Castro ("Practical Byzantine Fault Tolerance", January 2001, Ph.D. Thesis, Massachusetts Institute of Technology) can achieve consensus in two communication steps but, it provides relaxed safety guarantees. In a protocol with a relaxed safety guarantee, a request is committed permanently only if at least f+1 honest nodes commit it (compared to 1 honest node during strong safety). In PBFT with tentative execution a request execution can be revoked, even if the leader (primary) is not malicious (due to the relaxed safety guarantee). Moreover, PBFT with tentative execution suffers from an expensive view change protocol as the original PBFT.

A protocol is considered to provide relaxed safety if, in the presence of Byzantine faults, f+1 correct/honest nodes commit a block at a sequence s then no other block will ever be committed at sequence s. A protocol provides strong safety if in the presence of Byzantine faults a single correct/ honest node commit a block at a sequence s then no other block will ever be committed at sequence s.

Kuznetsov et al. in "Revisiting optimal resilience of fast byzantine consensus" (ACM Symposium on Principles of Distributed Computing, 2021, pp. 343-353) consider optimal resilience for fast Byzantine consensus and present the bound on Byzantine faults (maximum number of Byzantine faults tolerated) to be f=(n−1)/5 for fast Byzantine protocols. In contrast, the "MinBFT" of Veronese et al. in "Efficient byzantine fault-tolerance" (IEEE Trans. Computers, Vol. 62, No. 1, 2013, pp. 16-30) requires the user of trusted hardware, Trusted Execution Environments (TEEs), to prevent an equivocation attack. Although TEEs are considered to be secure recent work raises legitimate concerns about the security of TEEs by identifying several vulnerabilities. In contrast, the inventors propose a fast BFT-based consensus protocol, which they refer to as "Fast B4B", that can achieve consensus during normal execution with n=3f+1 (i.e. f=(n−1)/3). Accordingly, this Fast B4B protocol tolerates a larger maximum number of Byzantine faults than prior art fast BFT protocols and increased resilience as the tight upper bound on resiliency (number of faults tolerated) has improved to (f=n−1/3) within embodiments of the invention. Further, the inventive Fast B4B protocol does not require the use of any trusted hardware, e.g., TEEs. Fast B4B also guarantees strong safety when an honest primary is replaced. This prevents revoking the block from the honest primary being replaced (unlike PBFT with tentative execution). Moreover, if a primary is Byzantine then the cost of revoking a block that is committed by less than f+1 nodes (relaxed safety) is high. Though, a Byzantine primary can revoke its latest block that is committed by at most f honest nodes (By paying a high cost each time) for a limited number of times. Furthermore, Fast B4B employs efficient view change, making primary replacement faster.

As a tradeoff of its low latency, VBFT guarantees relaxed safety for a block proposed by a Byzantine primary (for a limited number of time). A Byzantine primary may revoke its latest block during view change (when it is replaced) if the block is committed by less than f+1 honest nodes. But in reality, this tradeoff does not harm protocol security. First revoking a block from the Byzantine primary (by the Byzantine primary) will not lower the chain quality. Secondly, these revoked transactions will not be considered committed by the clients. Hence, there will not be any double spending.

Chain quality can be defined as the number of blocks added by honest primaries divided by the number of blocks added by all primaries including malicious ones. In double spending, a request is considered committed by a client, which is then later revoked.

As stated, Fast B4B employs an efficient view change. The revocation is only possible if the primary node performs equivocation, i.e., propose multiple requests for the same sequence. Since equivocation attacks can easily be detected, the culprit primary can be easily blacklisted. Therefore, after blacklisting at most f Byzantine primaries, there will no Byzantine node left. This means that subsequently no equivocation will take place.

Whilst the Fast B4B protocol within this specification is presented within the context of blockchains and distributed ledgers the inventive Fast B4B consensus protocol can be adapted for other use cases. The Fast B4B protocol exhibits the following properties:

Optimal latency during normal protocol execution.
Strong safety guarantee for an honest primary/leader
Optimal resilience against Byzantine faults Practical throughput, comparable to the state-of-the-art consensus protocols; and
A simple design.

Background: Within what is known as the PBFT consensus protocol, see Castro et al. in "Practical Byzantine fault tolerance" (Proc. Third Symposium on Operating Systems Design and Implementation, 1999, pp. 173-186), a primary node broadcasts the proposal. There are then an additional two rounds of the broadcast before an agreement is reached (i.e. an overall process comprising three communication steps). The first round of broadcast is to agree on a request order. Once nodes agree on the sequence for the request, then the request will be assigned the same sequence even if the primary node is replaced (what is referred to as a view change). The second round uses broadcast to agree on committing or executing a request. The two-round broadcast is used to provide a guarantee that if at least a single node commits a request then after recovering from a view change all other nodes will commit the same request. This is due to the fact that if a single node completes the second round of broadcast (hence commits the request), then at least two-thirds of the other node have completed the first round of broadcast. Hence after the view change, these two-thirds of the nodes make sure the request that has been committed by at least by a single node will be proposed again in the same sequence by the next primary node (primary). This means the first round of broadcast is only necessary for the presence of a failure that will result in the view change. Therefore, this additional round during normal protocol operation can be removed. But if the first round is removed, this means agreement on the order and commit occurs in a single round. This is acceptable during normal protocol execution. But during view change, if at most f honest nodes which have committed a request b, there is no guarantee that the request will be committed in the same sequence when the new primary is in charge. To avoid this, the inventors introduce a recovery phase at the end of the view change to recover a request b that has been committed by at most f nodes. In this approach the new primary will be able to propose the next request, extending b.

However, there is also the problem of equivocation by a Byzantine primary. If the Byzantine primary proposes two equivocating proposals b and b', whereas one of them is committed by at most f honest nodes, then during a view change, the honest nodes cannot agree on the latest committed request to be extended by the new primary. Hence, the protocol will lose what is referred to as its liveness and will stall indefinitely. If the protocol chooses to extend one the of equivocating requests (b or b') then protocol safety cannot be guaranteed. For example, if request b has been committed by at most f nodes, and request b' is chosen (e.g. randomly) to be extended, then at most f honest nodes have to revoke request b.

However, if request b is committed by at least f+1 honest nodes, then it cannot be revoked through equivocation. Accordingly, although Fast B4B allows the equivocation and revocation of a request temporarily (if the request is committed by at most f nodes) before Byzantine get blacklisted, it avoids double-spending. The client only considers a request to be successfully committed by the network if it receives 2f+1 responses from distinct nodes, verifying that the request has been committed. In this case, out of 2f+1 nodes at least f+1 honest nodes have committed the request. The inventors have shown that a request revocation is not possible once the client considers a request committed (at least f+1 honest nodes commit a request). Moreover, to avoid equivocation in the future, Fast B4B blacklists equivocating primaries. Therefore, after blacklisting at most f Byzantine nodes, no equivocations will take place. Accordingly, after that, no request will be revoked anymore if it is committed by at least a single node.

Blockchain Use Case: The consensus mechanism is an integral part of blockchain technology. In blockchains, it is desirable to regularly change the primary (proposer) allowing an equal chance for every primary to propose. Moreover, frequent replacement of primary nodes reduces the time period an attacker can use to target the primary with a Denial-of-Service attack. Accordingly, a protocol should have an efficient view change mechanism. Achieving a strong safety guarantee while replacing an honest primary is also an important characteristic. This means the proposal of the honest primary will not be revoked if it is committed by at least one honest node. Unlike a protocol with relaxed safety (e.g., PBFT with tentative execution), Byzantine nodes in Fast B4B cannot revoke the proposal of an honest primary (committed by at least one honest node) during a view change. This approach prevents degradation in the chain quality.

Chain quality can be defined as the number of blocks added by honest primaries divided by the number of blocks added by all primaries including malicious ones. For example, if a proposal (block/request) b from an honest primary is committed by less than f+1 honest nodes, during the view change the next primary may receive histories of 2f+1 nodes who have not committed the latest proposal b. Hence, the next primary will propose another proposal b' that will revoke b. In this way, the chain of blocks/requests committed (executed) will mostly contain requests from malicious primaries. This reduces the chain quality. This revocation of honest blocks/requests is not possible in Fast B4B. But it is possible within the PBFT with tentative execution.

Definitions and Model: The inventive Fast B4B protocol of the inventors operates under the Byzantine fault model. Fast B4B can tolerate up to f Byzantine nodes where the total number of nodes in the network is n such that n=3f+1. The nodes that follow the Fast B4B protocol are referred to as correct or honest nodes.

It is assumed that nodes are not able to break encryption, signatures, and collision-resistant hashes. Further, the inventors assume that all messages exchanged among nodes are signed.

In order to avoid what is referred to as an FLP impossibility result, sec M. Fischer et al. in "Impossibility of distributed consensus with one faulty process" (J. ACM, Vol. 32, No. 2, pp. 374-382, 1985), the Fast B4B protocol assumes a partial synchrony model between nodes, see for example Dwork et al. in "Consensus in the presence of partial synchrony" (J. ACM, Vol. 35, No. 2, pp. 288-323, 1988), with a fixed but unknown upper bound on message delay. The period during which a block is generated is called an epoch. Each node maintains a timer. If an epoch is not completed within a specific period (called a timeout period), then the node will timeout and will trigger the change process (i.e. changing the primary). The node then doubles the timeout value, to give enough chance for the next primary to drive the consensus. As a state machine replication service, the Fast B4B protocol is needs to satisfy following properties.

Definition 1 (Relaxed Safety). A protocol is R-safe against all Byzantine faults if the following statement holds: in the presence of f Byzantine nodes, if 2f+1 nodes or f+1 correct (honest) nodes commit a block at the sequence (blockchain height) s, then no other block will ever be committed at the sequence s.

Definition 2 (Strong Safety). A protocol is considered to be S-safe in the presence of f Byzantine nodes, if a single correct node commits a block at the sequence (blockchain height) s, then no other block will ever be committed al the sequence s.

Definition 3 (Liveness). A protocol is alive if it guarantees progress in the presence of at most f Byzantine nodes.

View and View Number. A view determines which node is in charge (primary). A view is associated with a monotonically increasing number called view number. A node uses a deterministic function to map the view number into a node ID. In other words, the view number determines the primary for a specific view.

Signature Aggregation. The Fast B4B protocol according to embodiments of the invention employs signature aggregation in which signatures from nodes can be aggregated into a single collective signature of constant size. Upon receipt of the messages (M1, M2, . . . , My where 2f+1≤y≤n) With their respective signatures ($\sigma_1, \sigma_2, \ldots, \sigma_y$) the primary then generates an aggregated signature $\sigma \leftarrow \text{AggSign}(\{M_i, \sigma_i\}_{i \in N})$. The aggregated signature can be verified by replicas given the messages M1, M2, . . . , My where 2f+1≤y≤n, the aggregated signature $\sigma$, and the public keys $PK_1$, $PK_2$, . . . , $PK_y$. Signature aggregation has previously been used in BFT based protocols. Any other signature scheme where identities of nodes are known can be used.

Block and Blockchain Requests are also called a transaction. Transactions are batched into a block data structure. This optimization improves throughput as the network decides on a block instead of a single transaction. Each block keeps the hash of the previous block as a pointer to the previous block. Hence, building a chain of blocks called the blockchain.

Quorum Certificate (QC) and Aggregated QC. A quorum certificate (QC) is the collection of 2f+1 messages of a specific type from distinct nodes. For example, the collection of at least 2f+1 votes from distinct nodes for a block is called QC for the block denoted as $QC_b$. A block is certified when its QC is received. Similarly, a collection of 2f+1 view messages forms QC for the view change or $QC_V$. An aggregated QC or AggQC is a collection of 2f+1 $QC_V$'s. If b is the latest committed block or if $QC_b$ is the QC with highest view in the AggQC, then the $QC_b$, is called the highQC.

Fast B4B Protocol: The Fast B4B protocol according to embodiments of the invention operates two modes, a normal mode and a view change mode. The Fast B4B protocol operates in the normal mode where blocks are added into the chain until a failure is encountered. To recover from failure, the Fast B4B protocol switches to the view change mode. Upon successful completion of the view change the Fast B4B again returns to the normal mode. Referring to FIG. 3 there is depicted Algorithm 1 presenting exemplary utilities for a node i.

Normal Mode of Fast B4B Protocol. The message pattern during normal mode is given in the FIG. 5. A primary node receives requests/transactions from clients. A client c sends its signed transaction⟨ REQUEST, o, t, c⟩ to the primary. In a transaction field o is the operation requested by the client whilst t is a timestamp (where a primary uses t to order requests from client c).

The primary node builds a block (also called proposal/ pre-prepare message). The proposal message ⟨ PRE-PRE- PARE, v, s, h, parent, $QC_{nr}$, cmd⟩ includes the view number v, block sequence (block-chain height) s, block hash h, the parent block hash parent and the commands cmd which are to be executed. $QC_{nr}$ is the QC for the negative response. After a view change before proposing the first block a new primary may want to confirm that there is a block that has been committed by at most f nodes. If there is no such block the primary collects 2f+1 negative responses nr and builds $QC_{nr}$. Therefore, after a view change the $QC_{nr}$ field may be used only once. Further details are presented below in the View Change subsection.

The primary signs the proposal over the tuple⟨ v, s, h, parent⟩. The primary node then proposes the proposal to all nodes through a broadcast during the pre-prepare phase (sec Algorithm 2 in FIG. 4 at lines 15-19). Upon receipt of a proposal, a node i verifies the primary signature and the message format. Each node then makes a safety check through a SafetyCheck( ) predicate. The SafetyCheck( ) predicate accepts two parameters including the received block b and the highQC (latest QCbuilt from 2f+1 votes received for the previous block). In the absence of failure, the SafetyCheck( ) predicate ensures the proposal extends the latest committed block. Which means if the sequence of the latest committed block b' is s (the block has highQC), then the sequence of the received block b must be s+1. If b.s>b'.s+1, then it either means the node i is missing one or more committed blocks or the block proposal has invalid sequence. In the case of missing blocks, the node will download the missing blocks and their respective QCs. In case, of invalid block sequence, node i can send the block b' metadata (with invalid sequence) as a proof to the network to trigger a view change.

If there is a failure or view change, then the SafetyCheck ( ) predicate ensures any uncommitted block seen by at least f+1 honest nodes has been re-proposed for the same sequence (see below for further details). If the safety check is successful, then the node i broadcasts its vote⟨ Vote, v, s, h, parent⟩ signed over tuples⟨ v, s, h, parent⟩ (sec Algorithm 2 in FIG. 4 at lines 29-31).

Upon receipt of 2f+1 votes for a block b each node commits the block (commit phase). Each node also builds a QC from votes it received for the block b. This QC will be used as a proof of commit during view change or for providing proof of commit required by application that is running over the top of the Fast B4B protocol. Each node that has committed the block will also send a Reply message to clients whose transaction is included in the block (see Algorithm 2 in FIG. 4 at lines 32-35). A client considers its request/transaction being committed if it receives 2f+1 distinct Reply messages. Similarly, upon receipt of 2f+1 votes, the primary commits the block and proposes the next block in its queue.

If a client c does not receive Reply messages within some specific interval, then the client broadcasts its request to all nodes. Upon receipt of the request, if the request has been committed, then each node sends a Reply message. If it has not been proposed by the primary, nodes forward the request to the primary. If the primary still does not propose the block within the timeout period, then each node broadcasts a VIEW-CHANGE message to replace the primary. Similarly, if a block is not committed within a timeout period, the primary sends an invalid message or performs equivocation, and nodes will trigger the view change process. The view change process will result in replacing the faulty primary.

View Change: Within BFT-based protocols, a view change is used to replace the failed primary with a new primary. Nodes use a deterministic function to map the view number to the primary ID. A primary can be chosen by different means including, but not limited to, using a round-robin process or random selection.

In addition to selecting a new primary, a view change also involves the synchronization of information among nodes. More specifically, the new primary needs to determine the sequence number that it will use for its first request to be proposed. The block proposed in the new sequence number just after the view change must extend the latest block committed by at least one honest node (S-safety). In the inventive Fast B4B protocol the view change is different than the view change in classic BFT-based protocols as known in the art. Within the inventive Fast B4B protocol, there are two ways to extend the latest committed block. If the latest proposed block has been committed by more than f honest nodes, then the Fast B4B view change is similar to the view change in BFT consensus protocols as known in the art. But if the latest proposed block is committed by at most f honest nodes or has not been committed by any node then the Fast B4B protocol employs an additional data retrieval phase (two communication steps) to address this case. It should be noted that by piggybacking data retrieval phase with the view change messages, Fast B4B, will not suffer any additional communication steps during view change.

Moreover, if at most f honest nodes have committed a block, then the equivocation by a Byzantine primary may result in revocation of the latest committed block during the view change. Accordingly, to address this the inventive Fast B4B process after each revocation the blacklists the Byzantine primary. In this manner after blacklisting f nodes the Fast B4B protocol becomes S-safe. Furthermore, as stated, this revocation does not affect clients and will not result in double-spending.

If a node does not receive a message from the primary or a command is not executed within some interval, then the node broadcasts a VIEW-CHANGE message V=⟨ VIEW-CHANGE, v+1, qc, β, ⊥, i⟩. The qc is the QC for the latest committed block. Whereas β is the header of the latest uncommitted block for which node i has voted. In the instance the node receives a proof of maliciousness from primary e.g. multiple proposals for the same sequence, an invalid message etc., then it can include the proof too in the VIEW-CHANGE message (V=⟨ VIEW-CHANGE, v+1, qc, β, proof, i⟩ (see Algorithm 2 in FIG. 4 at lines 37-39). Once the new primary receives 2f+1 VIEW-CHANGE messages (which may include its own), it prepares a NEW-VIEW message⟨ NEW-VIEW, AggQC, v+1⟩. Here AggQC is the QC built from 2f+1 VIEW-CHANGE messages. The new primary then broadcasts the NEW-VIEW message to all nodes (see Algorithm 3 in FIG. 6 at lines 2-5). Each node that receives the NEW-VIEW message can extract important information out of it as described below:

1. The QC type field in the VIEW-CHANGE message in 2f+1 QC's in AggQC are used to extract the latest committed block by at least f+1 honest nodes. Since if f+1 honest nodes commit latest block, then any combination of 2f+1 VIEW-CHANGE messages will have at least one QC for the committed block by at least f+1 nodes (for more details see below for Lemmas 2 and 3). Though the QC of a block committed by at most f nodes may also end up in AggQC, but it is not guaranteed. If it did, then the new primary will extend the block committed by at most f nodes.

2. The β field in the 2f+1 VIEW-CHANGE messages in AggQC helps to extract the latest committed block by at most f honest nodes (in the absence of equivocation). If a block is committed by less than f+1 honest nodes, then it's QC may not end up among 2f+1 VIEW-CHANGE messages in AggQC, but since 2f+1 nodes (of which f+1 are honest) have voted for that block therefore, at least one β in AggQC will be from the latest committed block. There is also the possibility that the block/request of β may have not been committed by a single honest node. In that case, the next primary will have to collect the proof that the block from β has not been committed.

Therefore, upon receipt of NEW-VIEW message from the new primary, each node extracts the latest qc as well as β (if there is any) (see Algorithm 3 in FIG. 6 at lines 12-15). Each node then sends Ready message to the new primary. The new primary aggregates these Read messages into QC, and broadcasts it back. Upon receipt of each $QC_r$, each node is now ready to take part in the next view.

Presence of β. As stated β in the view change QC (QCv) is used to recover any block that has been committed by at most f nodes (in the absence of equivocation). But if there is not such a block, then the primary must provide proof that there is no block such that it has been committed by at most f honest nodes.

If the β field in all VIEW-CHANGE messages in AggQC are nil, then it means no block has been committed by at most f honest nodes. In other words, the latest proposed block has been committed by at least f+1 honest nocks. Therefore, the new primary will extend the block of the latest QC in the AggQC. In case there is a block b that has been committed by x number of nodes such that f≥x≥1, then the QC for block b may or may not end up in AggQC. In this case the Fast B4B protocol relies on β (for block b) to make sure the latest block gets extended after the view change. The β is only relevant if its view is greater than the view of latest QC (highQC) in AggQC such that β.s==highQC.s+1. If at least one VIEW-CHANGE message in AggQC has the QC for the latest committed block b (highQC), then the new primary will propose a block that will extend the block b. In this case β is not relevant since β.s≤highQC.s, then it is also possible that no VIEW-CHANGE message in AggQC has the QC for block b. However, it is guaranteed that at least one β in AggQC will be from the block b. In this case, if the new primary does not have the payload for the β from block b, then the primary will be able to retrieve the contents of block b from other nodes in the network.

The new primary then re-proposes the same block b at same sequence again as the first proposal after view change. Hence, in case there is a non-nil β (such that β.s==highQC.s+1), then the new primary must make sure that if there is a block that has been committed (by at most f honest nodes), then it should be recovered (if needed) and re-proposed. It is also possible that a block may not committed by any honest node but it's β has been received by new primary, and is therefore included in the AggQC. In this case, the new primary will try to retrieve the block for β (when β.s==highQC.s+1). If the block is retrieved, the primary will propose it for the same sequence. If the block is not retrieved then the primary has to provide proof to all honest nodes that such a block has not been committed by any honest node. This proof will allow the new primary to extend the block with the latest QC (instead of block of β) in the VIEW-CHANGE message.

Accordingly, it can be seen in the Algorithm 2 depicted in FIG. 4 that if there is a β such that β.s==highQC.s+1 and the primary has the payload for β, then it can propose the β's payload (see Algorithm 2 in FIG. 4 at lines 3-6). If the β payload is not present, then algorithm requires an additional data retrieval phase (see Algorithm 2 in FIG. 4 at line 8 and lines 12-14). The primary broadcasts a request to retrieve the payload for β. Now if β has been committed by at least node, then this means 2f+1 nodes have voted for it. This means 2f+1 nodes have the payload for β. Therefore when nodes respond to the request for β payload, at least one response will have the payload. Upon, receipt of the payload the new primary proposes the payload for β again.

There is also a possibility that the respective block for the β may not be committed by any honest node. In that case, the primary may not receive the β payload. But it is guaranteed that the new primary will receive 2f+1 negative responses from distinct nodes (Algorithm 2 in FIG. 4 at lines 9-11). These 2f+1 negative responses indicate that the block for the β has not been committed by any honest node. To prove that the respective block for β has not been committed, the new primary attaches the $qc_{nr}$ to its first proposal for the view. If there is a valid β and the new primary neither proposes its payload nor includes its $qc_{nr}$ during the first proposal, honest nodes will trigger a view change. Therefore, in the absence of equivocation, the Fast B4B guarantees S-safety since we know that the presence of the latest block QC or β will always be included in AggQC. Hence, the new primary will extend the latest committed block (in the absence of equivocation).

Figure 7:
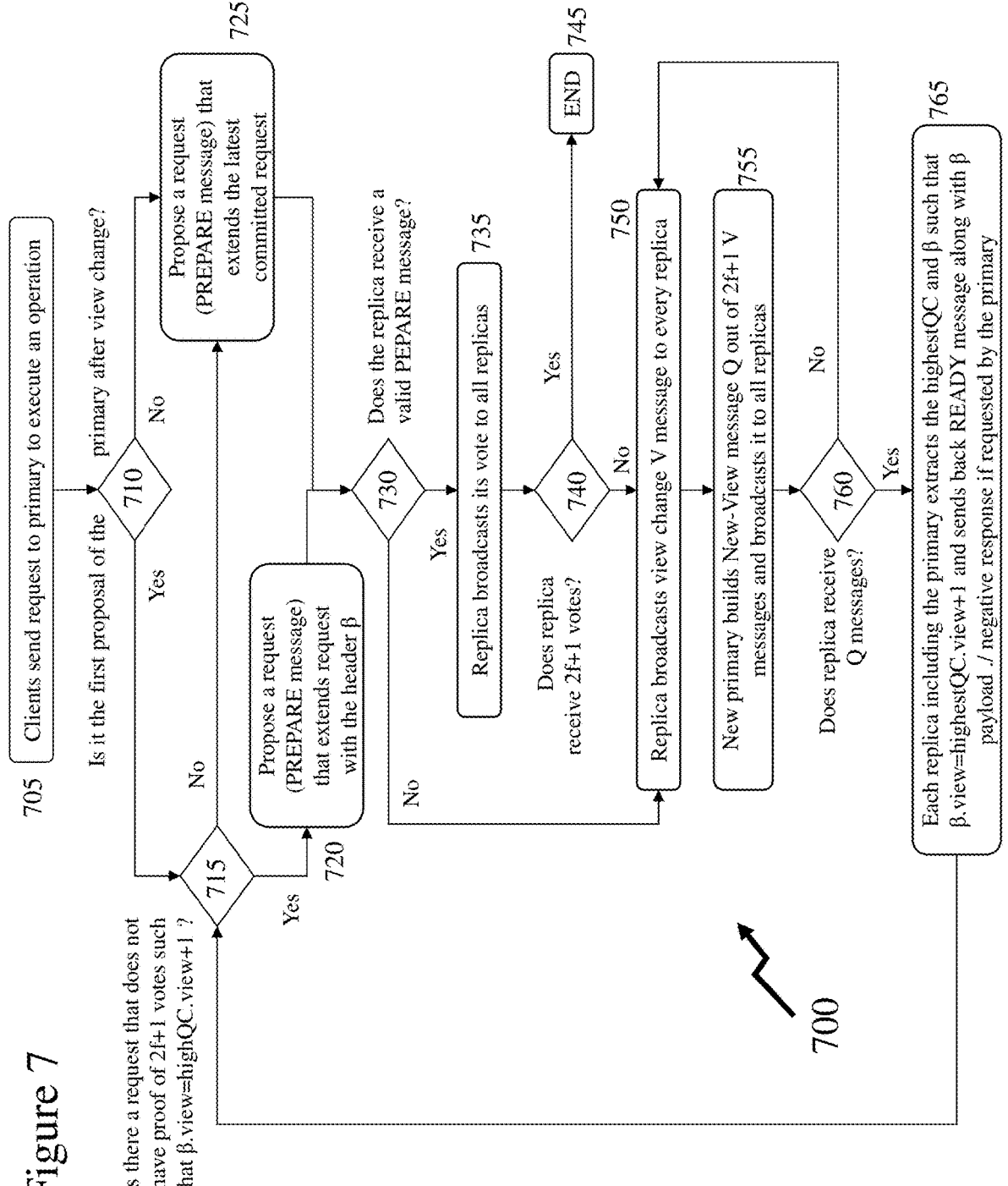
FIG. 7 depicts an exemplary process flow for a protocol according to an embodiment of the invention with respect to a request sent from a client to a primary to execute an operation.

Referring to FIG. 7 there is depicted an exemplary process flow, Process 700, for a Fast B4B protocol according to an embodiment of the invention with respect to a request sent from a client to a primary to execute an operation. As depicted Process 700 comprises first to thirteenth Steps 705 to 765 respectively. First to fifth Steps 705 to 725 relate to an initial sub-process with respect to whether the request from the client to the primary is first proposal after a view change and how this is handled upon both positive and negative determinations. Sixth to thirteenth Steps 730 to 765 relate to the subsequent processing of the request from the client. Referring to first to fifth Steps 705 to 725 these comprise:

First Step 705 wherein a client node (client) within a Fast B4B process sends a request (proposal) to a primary blockchain node (primary) to execute an operation;

Second Step 710 wherein the primary determines if this is the first proposal received after a view change process within the Fast B4B process according to an embodiment of the invention wherein upon a positive determination the Process 700 proceeds to third Step 715 otherwise the Process 700 proceeds to fifth Step 725;

Third Step 715 wherein a determination is made as to whether there is a request for a blockchain process to be undertaken that does not have proof of votes such that. Upon a positive determination the Process 700 proceeds to fourth Step 720 otherwise the process proceeds to fifth Step 725;

Fourth Step 720 wherein the primary proposes a request (PREPARE message) that extends the request with the header β wherein the Process 700 proceeds to sixth Step 730; and Fifth Step 725 where the primary proposes another request (PREPARE message) that extends the latest committed request wherein the Process 700 process to sixth Step 730.

Referring to sixth to thirteenth Steps 730 to 765 these comprise:

Sixth Step 730 wherein a determination is made by each node (hereinafter referred to as a replica, a node performing tasks within the Fast B4B process according to embodiments of the invention) as to whether it has received a valid PREPARE message from a primary wherein upon a positive determination the Process 700 proceeds to seventh Step 735 otherwise the Process 700 proceeds to tenth Step 750;

Seventh Step 735 wherein the replica broadcasts its vote to all other replicas and proceeds to eighth Step 740;

Eighth Step 740 wherein a determination is made by the replica as to whether it has received votes or not wherein upon a positive determination the Process 700 proceeds to ninth Step 745 otherwise the Process 700 proceeds to tenth Step 750;

Ninth Step 745 wherein the Process 700 ends as a replica has received votes;

Tenth Step 750 wherein the replica broadcasts a view change, V, message to all other replicas and then proceeds to eleventh Step 755;

Eleventh Step 755 wherein the new primary builds a New-View message, Q, from the out of V messages received from the replicas and broadcasts it to all replicas before proceeding to twelfth Step 760;

Twelfth Step 760 wherein a replica determines whether it has the New-View message, Q, or not wherein upon a positive determination the Process 700 proceeds to thirteenth Step 765 otherwise the Process 700 loops back to tenth Step 750; and Thirteenth Step 765 wherein each replica including the new primary extracts the and such that and sends back a READY message along with $\beta$ payload and/or negative response if requested by the primary wherein the Process 700 loops back to third Step 715.

Case of Equivocation (Byzantine primary). Since the inventive Fast B4B protocol achieves consensus in just two steps of communications it therefore allows the Byzantine primary to perform equivocation (i.e. proposing multiple blocks for the same sequence). In the case of equivocation if one of the proposed blocks is committed by f+1 honest nodes then the equivocation will not result in revocation of the block committed by f+1 honest nodes. Hence, equivocation will not be able to cause any safety or liveness issues. However, the problem arises if at most f honest nodes commit one of the equivocated blocks. In this case, there is a possibility that block committed by at most f nodes will be revoked.

In order to explain how revocation takes place, consider that there are two equivocated blocks $b_1$ ($\beta_1$) and $b_2$ ($\beta_2$) such that $b_1$ has been committed by f honest nodes. During the view change, the new primary receives VIEW-CHANGE messages from 2f+1 nodes. The new primary may receive VIEW-CHANGE messages containing $\beta$ for both blocks $b_1$ ($\beta_1$) and $b_2$ ($\beta_2$). Now if the new primary chooses to recover the payload for $\beta_1$ and re-proposes the payload for $\beta_1$ then the S-safety does not break or the S-safety condition holds.

However, if the new primary choose to extend $\beta_2$, then up to f nodes that have committed $b_1$, have to revoke $b_1$. Hence, the S-safety condition does not hold. Since at most f honest nodes have committed block $b_1$, therefore, the clients have not received 2f+1 Reply messages. As a result, clients still do not consider transactions in the block $b_1$ as committed. Therefore, the revocation does not result in double-spending. A client c can only get 2f+1 Reply messages for a transaction if its subsequent block is committed by at least f+1 honest nodes. As stated, if a block is committed by f+1 honest nodes then it will not be revoked (see the safety proof outlined below).

View Change Optimization (Computation). A view change in prior art VFT protocols can have quadratic cost of signature verification in AggQC. However, Jalalzai et al. in "Fast-hotstuff: A fast and resilient hotstuff protocol" (2021) this quadratic cost of signature verification can be reduced to linear. The proposed technique being to verify the aggregated signature of the AggQC along with the aggregated signature of the VIEW-CHANGE message with the highest QC. This is sufficient to guarantee the validity of the AggQC. The verification of the aggregated signature of the AggQC verifies that it contains VIEW-CHANGE messages from 2f+1 distinct nodes. The verification of the signature of latest QC ensure the latest QC and potential latest $\beta$ messages are valid. Thus, each node does not need to verify the aggregated signatures from the remaining 2f QCs.

View Change Optimization (Latency). The block recovery can be piggybacked with the VIEW-CHANGE messages. For this purpose, an additional bit field needs to be added into the NEW-VIEW message. When the new primary is building the NEW-VIEW message from 2f+1 VIEW-CHANGE messages, it simply switches the bit field to 1. Meaning, that it does not have the respective block for the $\beta$ (when $\beta.s$==highQC.s+1). Therefore, each responding node will send the respective block (payload) for $\beta$ or the negative response (in case payload for $\beta$isnotavailable) piggybacked with the Ready message. Similarly, the primary will also include the QC built from 2f+1 Ready messages with the first proposed block. In this way, 3 communication steps can be saved during view change.

Blacklisting Byzantine Primary: Amongst the possible forms of attack to blockchain an equivocation attack is one. It is mainly employed as a means of breaking protocol safety. Although it is a strong type of attack, in general it can be easily detected. In order to address this the inventors novel Fast B4B protocol blacklists primaries. It is important that this blacklisting is consistent throughout the network. Accordingly, Therefore, within the novel Fast B4B protocol the blacklisting of a Byzantine node is performed through a transaction. This allows the network to take a decision with respect to blacklisting and remain consistent.

When an honest node i receives multiple blocks for the same sequence, it knows that the primary is Byzantine and is trying to perform equivocation. Accordingly, the honest node broadcasts the proof (which includes the header of both equivocated blocks) which is included in the view change message. This will trigger a view change as explained above and depicted/described within Algorithm 3 in FIG. 6.

After the view change, honest nodes expect the new primary to include the blacklisting transaction in the block proposal. If the new primary does not propose a blacklisting transaction within timeout period, then the honest nodes forward the proof to the new primary and wait again for the blacklisting transaction to be proposed. If by the timeout the blacklisting transaction is not proposed by the primary, then the honest nodes trigger a view change by broadcasting VIEW-CHANGE messages. This process continues until the new primary proposes the transaction containing a blacklisting transaction.

It is also possible that a node is no longer the primary but another node i discovers proof of equivocation against it. In this case, the node i still broadcasts the proof to all nodes. Upon receipt of the proof a node j checks if the node that has performed equivocation has been blacklisted or not. If the equivocator is blacklisted then the proof is ignored by the node j. If not, then the node j forwards the proof to the current primary and waits for the proposal of the blacklisting transaction. If the primary does not propose the blacklisting transaction within a timeout interval, then node j broadcasts a VIEW-CHANGE message. Therefore, eventually, there will an honest primary that will propose the blacklisting transaction.

Proof of Correctness: In this section the inventors provide proof of safety and liveness for the inventive Fast B4B protocol. If we consider $S_h$ as the set of honest nodes in the network and $2f+1 \le |S_h| \le n$.

Safety: The inventors show that the Fast B4B protocol satisfies safety during the normal mode. Similarly the inventive Fast B4B protocol also satisfies Safety during a view change in the absence of equivocation. In doing so the Fast B4B protocol may fall back to R-safety but once all byzantine nodes (at most f) get blacklisted then the protocol will always guarantee S-safety. Below the inventors provide lemmas related to the inventive Fast B4B safety.

Lemma 1. The inventive Fast B4B protocol is S-Safe during normal execution of the protocol.

Proof: This lemma can be proved by contradiction. Assume that a block $b_1$, has been committed by a single node i such that $i \in S_h$ in the s. This means $2f+1$ nodes in a set $S_1$ have voted for block $b_1$. Similarly an honest node j ($j \in S_h$) commits a block $b_2$ in sequence s. A set of $2f+1$ nodes ($S_2$) have voted for block $b_2$. Since $n=3f+1$, then we have $S_1 \cap S_2 \ge f+1$. This means there is at least one honest node that has voted both for the block $b_1$ and $b_2$. But this is impossible since an honest node only vote once for a single block in same sequence. Accordingly, the inventive Fast B4B is S-safe during normal execution of the protocol.

Lemma 2. The inventive Fast B4B protocol is R-Safe during normal execution of the protocol.

Proof: From Lemma 1, we know that Fast B4B is S-safe during the normal mode. Therefore, we can conclude that if Fast B4B is S-safe during the normal mode, then it is also R-safe during normal mode.

Lemma 3. The inventive Fast B4B protocol is R-Safe during a view change.

Proof: Let us assume that a block $b_1$, is committed just before view change by a set of nodes $S_1 \cap S_h$ of size $f+1$. During a view change $2f+1$ nodes (out of which at least $f+1$ nodes are honest nodes) in set $S_2$ send their VIEW-CHANGE messages to the new primary. The new primary aggregates the $2f+1$ VIEW-CHANGE messages into NEW-VIEW message (Algorithm 3 in FIG. 6). Since $S_1 \cap S_2 = S$ and $|S| \ge 1$ then there is at least honest node that has committed block $b_1$ and has its VIEW-CHANGE message $V \in$ NEW-VIEW. This means when the new primary broadcasts the NEW-VIEW message, every receiving node will know that by is the latest committed block. Therefore, the new primary will have to extend the block $b_1$.

Lemma 4. The inventive Fast B4B protocol is S-Safe during view change when there is no equivocation.

Proof: A block b is committed by a single node i at the sequence s just before the view change. This means a set of nodes $S_1 \ge 2f+1$ have voted for the block b. During the view change the new primary collects VIEW-CHANGE messages from another set of $2f+1$ nodes $S_2$ into NEW-VIEW message. There is no guarantee that the VIEW-CHANGE message from node i is included in the NEW-VIEW message built from VIEW-CHANGE messages of nodes in $S_2$. But each node in $S_2$ has included the latest $\beta$ (block header it has voted for) in its VIEW-CHANGE in NEW-VIEW message. Since $n=3f+1$ therefore, $S_1 \cap S_2 \ge f+1$. This means that there is at least one honest node j in the intersection of $S_1$ (that has voted for the block b) and $S_2$ (has its VIEW-CHANGE $V_j \in$ NEW-VIEW message). Therefore, the new primary can retrieve the payload for $\beta$ (block b's header) and propose it for same sequence s as shown in Algorithm 2 in FIG. 4.

Lemma 5. After blacklisting f Byzantine nodes, the Fast B4B will guarantee S-safety.

Proof: A Byzantine primary may perform equivocation by proposing multiple blocks for the same sequence. As outlined above an equivocation attack can be detected and the culprit primary node blacklisted. Therefore, upon blacklisting f Byzantine nodes, there will not be any Byzantine node left to perform equivocation when selected as a primary. Hence, there will be no more equivocation therefore based on Lemmas 1, 2, 3, and 4. The Fast B4B protocol is S-safe after blacklisting f equivocating nodes.

The above lemmas prove that the inventive Fast B4B protocol is always R-safe. Also the inventive Fast-B4B is S-safe during the normal mode and view change (when there is no equivocation). After, blacklisting f Byzantine primaries, due to equivocation the inventive Fast B4B protocol will always guarantee S-safety.

Liveness: The inventive Fast B4B consensus protocol has guaranteed that it makes progress eventually and will not stall indefinitely. Fast B4B replaces a primary through a view change if the primary fails to make progress. The inventive Fast B4B exploits techniques from PBFT to provide liveness. The first technique includes an exponential back-off timer where the timeout period is doubled after each view change to give the next primary enough time to achieve the decision on a request/block Secondly, a node broadcasts VIEW-CHANGE message if it receives $f+1$ VIEW-CHANGE messages higher than its current view from distinct nodes. This guarantees that at least one message is from an honest node. Moreover, if a node receives $f+1$-VIEW-CHANGE messages for different views greater than its current view, it will broadcast a VIEW-CHANGE message for the smallest view of the $f+1$ VIEW-CHANGE messages.

Third, to prevent the protocol to be indefinitely in a state of view change, a node will not broadcast a VIEW-CHANGE message and trigger a view change if it receives at most $f < n/3$ VIEW-CHANGE messages. Therefore, Byzantine nodes cannot trigger a view change until at least one honest node also broadcast a VIEW-CHANGE message.

If the primary is selected in round robin-manner, then after at most f Byzantine primaries, an honest primary will be selected. Therefore, progress will be made eventually. Similarly, if the primary is being selected randomly then the probability of a bad event (selection of a Byzantine primary) is $P_b=1/3$. By considering such a bad event as the Bernoulli trial, we have the probability of a bad event for k consecutive views as $$P_b^k.$$

This shows that $$P_b^k$$

quickly approaches zero k increases. Therefore, eventually, an honest node will be selected as primary so that the protocol can make progress.

Accordingly, the inventors have presented above what they refer to as a Fast B4B consensus protocol for blockchains and distributed ledgers. The Fast B4B protocol achieves consensus during normal protocol operation in just two communication steps. The inventors have shown that the previous optimal bound for Byzantine resilience can be improved from f=(n+1)/5 (sec Kuznetsov) to f=(n−1)/3. Furthermore, the inventive algorithm does not employ any trusted hardware to achieve this improvement. Further, the inventive algorithm has strong safety guarantees for honest primaries and has an optimized view change.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. The method comprising providing a plurality of n nodes communicating via a communications network, each node performing tasks relating to the distributed ledger and comprising a microprocessor for executing software instructions stored within a memory accessible to the microprocessor; and providing the memory storing the software instructions where the software instructions relate to processing blocks of the distributed ledger and a protocol for handling Byzantine faults within a subset of the plurality of n nodes; wherein the protocol operates in two modes, a normal mode and a view change mode;

the protocol achieves consensus whilst operating in the normal mode with only two communication steps between the plurality of n nodes via a communications network, these comprising:

a first communication step of the two communication steps being receipt of a message via the communications network at each node of the plurality of n nodes of a proposal message signed and broadcast by a primary node of the plurality of n nodes via the communications network relating to a block b; and a second communication step of the two communication steps being transmittal of another broadcast message via the communications network comprising a vote for the block b from each the node of the plurality of n nodes which performs a successful safety check of the signed proposal message after successful verification of a primary signature within the signed proposal message and a message format of the signed proposal message;

each node of the plurality of n nodes commits the block b upon receipt of 2f+1 votes for the block b from the plurality of n nodes;

the protocol can reach consensus when a number f of the plurality of n nodes exhibit a Byzantine fault; and f is the upper bound on number of Byzantine nodes and f=(n−1)/3.

2. The method according to claim 1, wherein each node of the plurality of n nodes that commits to the block b sends a reply message to each client for whom a transaction is included within the block b;

each client establishes that its transaction is committed upon receipt of 2f+1 reply messages; and the primary also commits the block b upon receipt of the 2f+1 votes.

3. The method according to claim 1, wherein each node of the plurality of n nodes that commits to the block b further builds a quorum certificate (QC) from the votes it received for block b; and the QC is subsequently employed either as a proof of commit during a subsequent view change mode to replace the primary or as proof of commit to an application executing over the top of the protocol relating to transactions.

4. A system comprising:

a plurality of n nodes communicating via a communications network, each node performing tasks relating to a distributed ledger and comprising a microprocessor for executing software instructions stored within a memory accessible to the microprocessor; and the memory storing the software instructions where the software instructions relate to processing blocks of the distributed ledger and a protocol for handling Byzantine faults within a subset of the plurality of n nodes; wherein the protocol operates in two modes, a normal mode and a view change mode;

the protocol achieves consensus whilst operating in the normal mode with only two communication steps between the plurality of n nodes via a communications network, these comprising:

a first communication step of the two communication steps being receipt of a message via the communications network at each node of the plurality of n nodes of a proposal message signed and broadcast by a primary node of the plurality of n nodes via the communications network relating to a block b; and a second communication step of the two communication steps being transmittal of another broadcast message via the communications network comprising a vote for the block b from each the node of the plurality of n nodes which performs a successful safety check of the signed proposal message after successful verification of a primary signature within the signed proposal message and a message format of the signed proposal message;

each node of the plurality of n nodes commits the block b upon receipt of 2f+1 votes for the block b from the plurality of n nodes;

the protocol can reach consensus when a number f of the plurality of n nodes exhibit a Byzantine fault; and f is the upper bound on number of Byzantine nodes and f=(n−1)/3.

5. The system according to claim 4, wherein each node of the plurality of n nodes that commits to the block b sends a reply message to each client for whom a transaction is included within the block b;

each client establishes that its transaction is committed upon receipt of 2f+1 reply messages; and the primary also commits the block b upon receipt of the 2f+1 votes.

6. The system according to claim 4, wherein each node of the plurality of n nodes that commits to the block b further builds a quorum certificate (QC) from the votes it received for block b; and the QC is subsequently employed either as a proof of commit during a subsequent view change mode to replace the primary or as proof of commit to an application executing over the top of the protocol relating to transactions.

7. Non-volatile non-transitory storage media storing computer executable instructions, wherein the computer executable instructions when executed configure each microprocessor of a node of a plurality of n nodes to execute a process for processing blocks of a distributed ledger; wherein the process includes a protocol for handling Byzantine faults within a subset of a plurality of n nodes which communicate information relating to the distributed ledger via a communications network;

the protocol operates in two modes, a normal mode and a view change mode;

the protocol achieves consensus whilst operating in the normal mode with only two communication steps between the plurality of n nodes via a communications network, these comprising:

a first communication step of the two communication steps being receipt of a message via the communications network at each node of the plurality of n nodes of a proposal message signed and broadcast by a primary node of the plurality of n nodes via the communications network relating to a block b; and a second communication step of the two communication steps being transmittal of another broadcast message via the communications network comprising a vote for the block b from each the node of the plurality of n nodes which performs a successful safety check of the signed proposal message after successful verification of a primary signature within the signed proposal message and a message format of the signed proposal message;

each node of the plurality of n nodes commits the block b upon receipt of 2f+1 votes for the block b from the plurality of n nodes;

the protocol can reach consensus when a number f of the plurality of n nodes exhibit a Byzantine fault; and f is the upper bound on number of Byzantine nodes and f=(n−1)/3.

8. The non-volatile non-transitory storage media according to claim 7, wherein the safety check of the signed proposal message by a node of the plurality of n nodes accepts two parameters, these being the received block b and a quorum certificate built from 2f+1 votes received by that node of the plurality of n nodes for the previous block within the distributed ledger employed to generate block b.

9. The non-volatile non-transitory storage media according to claim 7, wherein each node of the plurality of n nodes that commits to the block b sends a reply message to each client for whom a transaction is included within the block b;

each client establishes that its transaction is committed upon receipt of 2f+1 reply messages; and the primary also commits the block b upon receipt of the 2f+1 votes.

10. The non-volatile non-transitory storage media according to claim 7, wherein each node of the plurality of n nodes that commits to the block b further builds a quorum certificate (QC) from the votes it received for block b; and the QC is subsequently employed either as a proof of commit during a subsequent view change mode to replace the primary or as proof of commit to an application executing over the top of the protocol relating to transactions.

* * * * *